Feb. 22, 1938. E. C. SCHACHT Re. 20,660

METHOD OF COATING AND APPARATUS THEREFOR AND PRODUCT

Original Filed July 30, 1928 3 Sheets-Sheet 1

Inventor
Elmer C. Schacht

By Cushman Darby & Cushman
Attorneys

METHOD OF COATING AND APPARATUS THEREFOR AND PRODUCT

Original Filed July 30, 1928 3 Sheets-Sheet 2

Inventor
Elmer C. Schacht

By
Attorneys

Feb. 22, 1938. E. C. SCHACHT Re. 20,660
METHOD OF COATING AND APPARATUS THEREFOR AND PRODUCT
Original Filed July 30, 1928 3 Sheets-Sheet 3
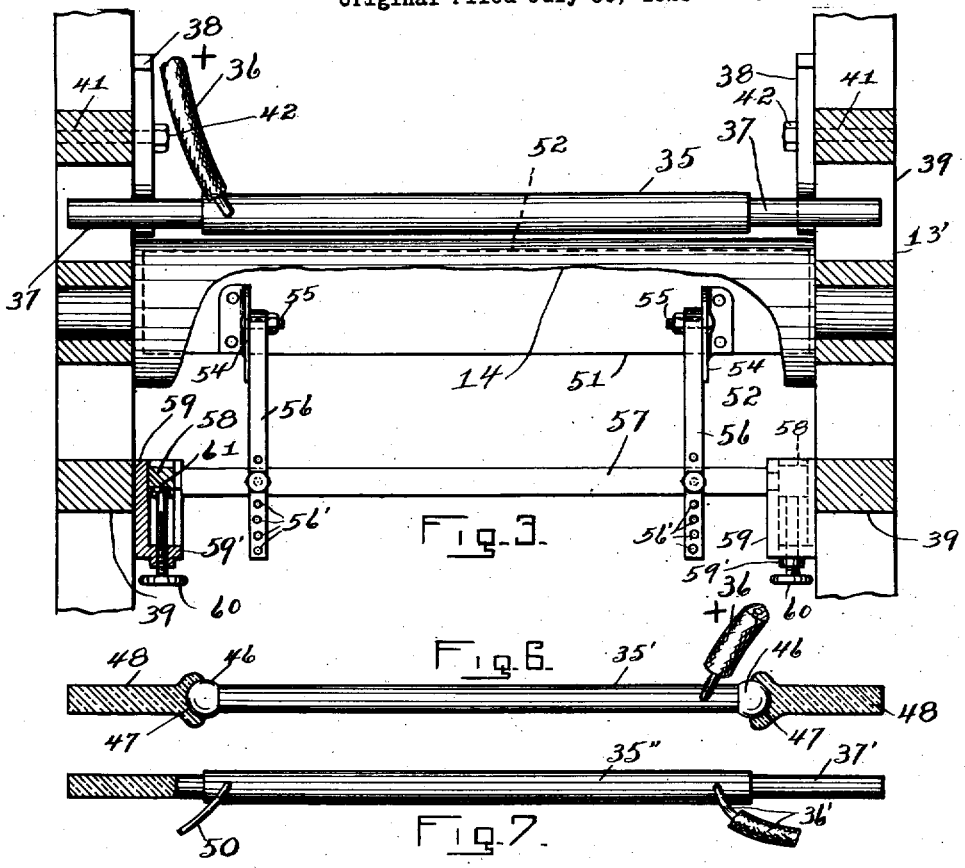
Fig. 3.
Fig. 6.
Fig. 7.
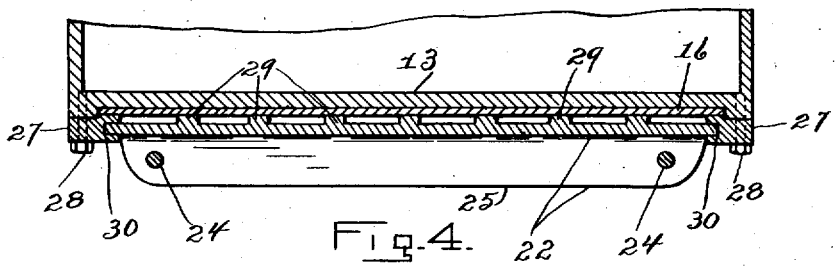
Fig. 4.
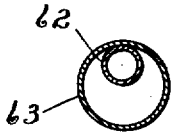
Fig. 5.
Inventor
Elmer C. Schacht
By
Cushman Darby & Cushman
Attorneys Reissued Feb. 22, 1938

Re. 20,660

UNITED STATES PATENT OFFICE 20,660

METHOD OF COATING AND APPARATUS THEREFOR AND PRODUCT

Elmer C. Schacht, Troy, N. Y., assignor, by mesne assignments, to Behr-Manning Corporation, a corporation of Massachusetts Original No. 2,027,307, dated January 7, 1936, Serial No. 296,323, July 30, 1928. Application for reissue December 27, 1937, Serial No. 182,007

45 Claims. (Cl. 91—68)

This invention relates to the art of coating with finely divided or fragmentary material.

An object of the invention is to provide an improved method for coating with such material, and an apparatus for carrying out the method.

The invention seeks to provide an improved method for controlling the arrangement or distribution of the particles upon the surface to be coated.

The invention contemplates an arrangement or distribution control which will effect proper distribution or dispersion of the particles with reference to one another, and preferably also the proper positioning or orientation of each individual particle, so that in providing a coated surface of abrasive material, for instance, the particles have their major axes substantially perpendicular to the carrier or to the abrasive surface whereby the sharpest portion of each particle will be exposed with the major axes of the particles disposed substantially perpendicularly to the surface of the carrier.

The method and apparatus will be described in their application to the manufacture of an abrasive paper, such as sand paper, although it will be understood that while particularly useful in the manufacture of such material, the invention is not limited in broader aspects to this particular field.

Abrasive paper, by which is meant any abrasive sheet or strip material having an abrasive surface, such as sand, ordinarily consists of a backing or carrier of paper or fabric, or combined paper and fabric, which is first provided with an adhesive surface upon which the abrasive or cutting material, such as sand, is then deposited.

Abrasive paper is of two general types. In one type, the adhesive surface of the carrier or backing is completely covered with the abrasive grains or fragments. The individual grains are closely packed, so that virtually no portion of the backing surface is exposed. Such a coating of abrasive material is commonly called a "closed coating."

In the second type, the individual particles or grains are spaced apart as uniformly as possible over the surface, so that each grain stands by itself or alone as a unit of the abrasive surface. Such a coating of abrasive material is termed an "open coating".

The open coating is considered preferable for abrasive paper in some usages, since it does not tend to load or become packed with the material which is abraded. In some cases, a closed coating, in which the interstices between the individual grains are extremely small, and virtually non-existent, quickly becomes loaded or embedded with the material abraded, and this results in excessive friction and finally the burning of both the abrasive and abraded surfaces. Such loading and burning is especially noticeable when abrading soft materials or materials of a gummy or resinous nature. The open coating overcomes this objection, since in view of the substantial space around each of the abrasive grains, the abrasive surface does not become packed, and the particles removed from an abraded object do not remain in the interstices between the individual grains.

In the manufacture of both types of coating, it is preferable to arrange or orient the individual grains so that their major axes are substantially perpendicular to the carrier with the result that their sharper and more pointed portions are exposed. Furthermore, in the formation of an open coating, it has always been a problem to obtain the desired arrangement or dispersion of the individual grains with reference to one another. This dispersion or spacing of the individual particles is a problem particularly important in the formation of an open coating, but the proper distribution of the particles as they are deposited upon the carrier is also important in the manufacture of a closed coating. In the manufacture of the closed coating, it is customary to drop or deposit upon the adhesively coated carrier a greater amount of abrasive than it can hold. The surplus is then removed. Consequently, the only control as to the amount of abrasive retained is the holding capacity of the adhesive. In order to control accurately the amount of abrasive applied on a closed coating, it is, therefore, important to see that the surface is uniformly covered, and due to this it is necessary that the particles be uniformly distributed at the instant the abrasive is applied to the adhesive. When the particles are simply dropped on the adhesively coated carrier and no dispersing method employed, the resultant surface reflects any irregularities which are present in the fall or passage of the sand, and these irregularities produce streaks or ridges in the coating. It has also been found that there is a tendency in dropping sand or other abrasive particles for the latter to bunch together and produce what is called a lumpy or bunchy coating which greatly impair the cutting efficiency of the sheet because there are created a multiplicity of small high areas which come in contact with the surface to be abraded. Obviously, these areas keep much of the abrasive out of contact with the surface being abraded, and thus reduce the efficiency of the sheet.

It will be understood, therefore, that by the terms "dispersion" or "arrangement", as applied to the particles, is not meant any particular spacing of the particles relative to one another, since the particles are "dispersed" or "arranged" relative to one another regardless of whether an open or closed coating is being formed. So far as the method of this invention is concerned, the difference between an open and closed coating resides solely in the extent or degree to which the electrostatic field is used, i. e., a stronger field or different disposition of the same is employed to produce an open coating than a closed coating. But in the manufacture of both types of coating, the electrostatic field may be effectively employed to produce the desired arrangement or dispersion of particles in the abrasive stream.

Heretofore, it has been the common practice to supply the abrasive material, such as sand, from a hopper by means of a feed roll having associated therewith an adjustable gate which controls the feed of sand. In the use of coarser grades of sand or abrasive material, such a means for controlling its application has been found to be effective, to a certain extent, since coarse sands will not bind or pack between the gate and the feed roll and will flow uniformly between the gate and roll to produce an open coating upon the carrier. However, it has been observed that this expedient does not effectively guarantee the uniformity of particle distribution or the equalization of density throughout the different areas, and, moreover, it has no effect upon the sharpness of the abrasive surface produced, and does not have a tendency to arrange each individual particle so that its sharpest portion or point is exposed.

In the use of fine abrasive material, such as number 240 sand, a feed gate and roll or similar apparatus does not produce a uniform flow, even though the gate and feed roll surfaces are finely ground and brought extremely close together. The difficulty is particularly due to the tendency of the sand to pack or bind in the gate. As a result, the abrasive surface is characterized by bare spots, blotches, bars and streaks.

Consequently, in the manufacture of abrasive paper from fine abrasive material, it is necessary to exercise extreme care to obtain a uniform flow of sand and to finely grind and adjust both the gate and feed roll.

The present invention seeks to provide an improved means for obtaining proper arrangement of the sand both with respect to the uniform dispersion or spacing of the particles relative to one another, and also with respect to the arrangement or orientation of each particle considered individually to expose its sharpest portion.

The invention also contemplates an improved apparatus for carrying out this method.

Essentially, the invention comprises the use of an electrical charge produced by an electrostatic field, which is arranged so as to influence the individual sand particles to obtain the proper distribution of the same over the surface, and also preferably to position or "orient" each particle so that its major axis is substantially at right angles to the abrasive surface whereby the sharpest and therefore most effective abrasive portion is exposed.

The invention also contemplates the use of the electrical field in such a manner that the stream of abrasive particles, as it flows toward the carrier, is controlled by the electrical field so as to cause a uniform distribution of the same relatively to one another, and thus produce a misting of the particles over a much greater area and eliminate ridges and streaks as well as the bunchiness or lumping in the coating.

In providing the electrostatic field, the invention seeks to dispense with the necessity for accurately grinding and spacing the gate and feed roll. It has been found preferable to dispose the field so that it will affect the sand as it travels under the influence of a uni-directional force, such as gravity, which propels the material toward the surface of the carrier to be coated, thus permitting the field to disperse the entire sand-shower. The method also contemplates the selecting off from the dispersed or electrified shower, as by means of a baffle, any excess sand not desired, and permitting the remainder to drop with the particles in their properly dispersed relation and also individually oriented, i. e., sharpest points up, upon the adhesive surface. By properly arranging the electrostatic field, the method will also maintain a predetermined relation between each particle in the field until it is united with the surface, thus obtaining exposure of the sharpest and most abrasive portion of each particle.

In carrying out the method, a supply of sand may be arranged in a hopper above an adhesively surfaced carrier or backing. The hopper may, if desired, be provided with an adjustable gate and feed roll for controlling to a certain extent the showering of the sand upon the adhesive surface to be coated, although the sand may be dropped toward the carrier in surplus quantities. The electrostatic field is disposed between the carrier and gate, so that the sand must travel through or adjacent the field before it reaches the carrier.

The sand particles are each influenced by the electrical charge, which serves to fan or spread out and disperse the shower, maintaining the particles in substantially uniformly spaced relation until they reach the carrier. It will be found that the voltage or power of the field may be regulated to control the extent to which the particles are fanned out or dispersed, and, of course, a factor in this control will be the character of the coating desired. If a closed coating devoid of ridges or bunchiness is desired, the field will be of a character which will simply provide the uniform distribution necessary to prevent these defects. If an open coating is required, the field will be controlled so as to disperse the particles relatively to one another to a greater extent. If the sand is showered in surplus quantities, a baffle or diverting plate may be suitably arranged to divert from the normal path of the shower any portion thereof which it is desired to exclude from the carrier. The position of the baffle will, of course, vary depending upon the character of the coating desired, and the amount of sand being showered toward the carrier surface.

The particles not led off from the shower continue on to the carrier and fall upon its adhesive surface. Due to the dispersing action of the electrostatic field, the particles are deposited upon this surface in substantially uniformly spaced relation, thus providing an ideal open coating. When applied to an abrasive medium such as sand, the electrostatic field has been found to be extremely efficient, and even though the controlling gate is opened quite wide to overcome the packing tendency of fine sands, and to provide a flow in excess of that required to use a coating, the use of the field will properly disperse the entire shower from which may be led off such excess portions as are not to be permitted to fall upon the adhesive surface. The use of such an excess flow eliminates the necessity for maintaining the gate and feed roll accurately ground or adjusted, and moreover, the irregularities of sand flow due to surface imperfections on the gate or roll have been found to be relatively small in relation to the large amount of sand flowing.

As will be understood, the deposition of the particles upon the carrier uninfluenced by any force which tends to oppose the effect of the electrostatic field, except, of course, the weight of the particles themselves, permits the field to effect desired control of position and the particles are, as a result, arranged upon the carrier under the influence of the field substantially unaffected by any other force.

Furthermore, it has been found that the resultant abrasive surface is much sharper than a surface produced by simply dropping the material upon the carrier, even though attempts may be made to control the arrangement of the same by other media than electrical means.

In obtaining the proper orientation of each individual particle with its sharpest portion exposed, it is thought that the field causes substantially each particle to align itself so that its longest axis is virtually parallel to the lines of force of the field. The rate of discharge of an electrostatic charge is dependent upon the surface characteristics of the charged body, and the larger the radius of curvature, the slower the rate of discharge, and the sharper the point, the faster the rate of discharge. It is believed that this relation of the rate of discharge of the surface characteristic of the charged body, e. g., sand grain with a pointed abrasive portion, discharge of the surface characteristic of the charged body, e. g., sand grain with a pointed abrasive portion, causes the sharpest points of the grains to orient themselves so that their major axes are parallel to the lines of force of the field, with the result that the particles are deposited upon the surface with their sharpest points directed away from the carrier and with the major axes of the particles perpendicular to the carrier. Consequently, the points are made to project outwardly, and the resultant coating is very much sharper than a coating made without the use of an electrical force for orienting or arranging each individual particle. Obviously, of course, such an arrangement or orientation of the particles is useful in either a closed or open coating, since it (1) increases the sharpness of the coating and enables faster and easier cutting, (2) minimizes heating and loading, and (3) increases the cutting life or capacity of the abrasive surface.

Moreover, it will be clear that the use of the electrostatic field in the formation of a closed coating prevents lumping or bunching of the sand by distributing the same over the entire area or surface to be coated. It blends out the irregularities which would otherwise develop in the stream due to lack of uniformity in the feed gate and to other factors which modify the effect of gravity, or other means which may be used to direct the stream to the carrier.

It will be understood, of course, that the electrostatic field can be used as a dispersing means with any type of particles whether abrasive or non-abrasive, to insure a uniform distribution, and irrespective of the nature of the substance or carrier upon which they are being deposited.

In the manufacture of sand paper, the electrostatic field is particularly useful. Although, in producing any particular grade of paper the particles are of approximately equal size and weight, it has, for many years, been the practice to use particles known as (*a*) control, (*b*) undergrade, and (*c*) overgrade; the control particles predominate. It has been found that the electrostatic field utilized in the manner herein described tends to stratify the particles and cause to locate on the top surface the larger particles, that is, the particles having larger areas of cutting surface.

It will be understood, therefore, that the control or change of position of the various particles effected by the field has three characteristics: First, the particles are oriented or turned by the lines of force so that the sharper surfaces of the abrasive coating are exposed. Second, the various particles are stratified so that the larger or more effective particles are on the surface. Third, the particles are dispersed to produce a more uniform coating, due to the fact that they are mutually repellent.

The dispersion of the particles is caused by the fact that, as they enter the field, they acquire a charge of the same polarity of that of one of the poles forming the field, and since all of the particles have been graded to approximately the same size, although some are undergrade, some are overgrade and others are control particles, they all acquire a charge of approximately equal intensity and of the same polarity. Hence, all of the particles in any shower, as they pass through the field on their path to the other pole are mutually repellent with a substantially equal repelling force and thus arrange themselves so that they are substantially equidistant in all directions. This repellent action is effected not only as the particles pass through the field but on the carrier.

It is preferred that the electrical field be arranged at the point of deposition of the particles, so that this control of position is exercised at the point of deposition and at the time the particles strike the carrier. As a consequence, the positions of the particles will be controlled before the adhesive has set and will be effected on the carrier as well as in the path of the particles to the carrier.

In practicing the method, various forms of apparatus may be employed, and in the accompanying drawings showing a preferred form:

Figure 3 is a horizontal sectional view on the line 3—3 of Figure 1, with the feed roll shown in elevation, and partly broken away.

Figure 4 is a fragmentary sectional view on the line 4—4 of Figure 1.

Figure 5 is a cross sectional view of a modified form of discharge electrode.

Figure 6 is an elevational view of a modified form of discharge or high potential electrode having its ends formed to eliminate "end effect", and Figure 7 is a top plan view of another form of discharge electrode.

Figure 1:
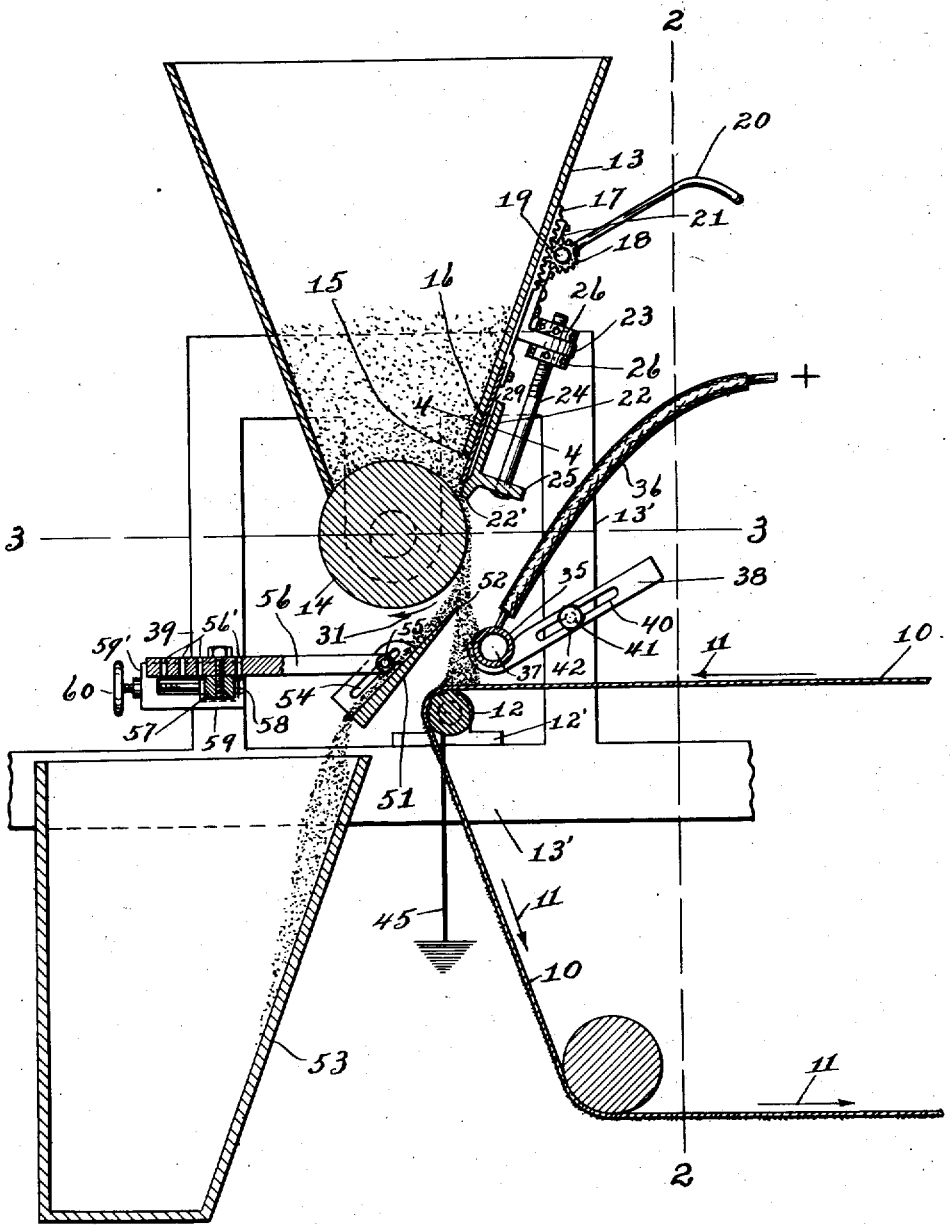
Figure 1 is a vertical sectional view on substantially the line 1—1, of Figure 2.

Referring to the accompanying drawings for a more detailed description, 10 indicates the carrier or paper sheet which may be fed in the direction of the arrows 11 by suitable means (not shown) over a roll 12 having end bearings in brackets 12' on the frame 13'. As will be understood, the paper has an adhesively coated top surface exposed to receive sand or other abrasive material dropped from a hopper 13, the lower end of which is partly closed by a feed roll 14. A wall of the hopper terminates at 15, a short distance above the feed roll to provide a discharge opening for the sand, which may be entirely closed by means of a shut-off gate 16 operable by means of a pair of rack bars 17 engaged by gears 18 upon a rock shaft 19, the latter carrying an operating lever 20 and being mounted in bearings 21 upon the wall of the hopper. The gate 16 is provided for the purpose of entirely shutting off the supply of sand when desired, and a second regulating gate 22 for adjusting the size of the opening between the lower end of the gate 16 and the periphery of the sand roll is adjustably mounted in brackets 23 by means of adjusting rods 24 secured to an outwardly extending rib 25 upon the gate, and extending through openings in the bracket. Clamping nuts 26 on opposite sides of the bracket webs through which the bolts 24 extend serve to secure the gate in any set position. As will be observed from Figure 4, the shut-off gate 16 is arranged between the regulating gate and the hopper wall, and it fits closely in a slideway formed by strips 27 secured to the hopper by bolts 28. The regulating gate 22 is provided on its rear surface with ribs 29 which abut the face of the shut-off gate and assist in providing a guideway for the same.

As the regulating gate is adjusted by means of the adjusting bolts 24, it is adapted to slide in grooves 30 (Fig. 4) formed in the strips 27 secured to the hopper.

When sand or other finely divided abrasive material is arranged within the hopper, operation of the feed roll in the direction of the arrow 31 (Fig. 1) after the shut-off gate has been opened and the regulating gate has been suitably adjusted, will cause the sand to drop downwardly in a shower toward the exposed adhesively coated surface of the carrier 10. Thus, by the use of the feeding means and gravity, the abrasive particles are introduced into an electrical field which is established in the manner hereinafter described.

The amount of sand discharged between the periphery of the sand roll and the end 22' of the adjusting gate 22, will, of course, depend upon the adjustment of the gate.

An electrostatic field may be formed by means of a tube 35 connected, as by means of a lead wire 36, to a source of high voltage (not shown). The tube 36 may be supported at its ends by means of insulating posts 37 carried by brackets 38 upon the frame 13'. The brackets 38 may be provided with elongated slots 40 receiving bolts 41 with clamping nuts 42, whereby the position of the electrode may be varied as desired. The zero or ground potential side of the field may be provided by means of the paper carrying roll 12 which may be formed of suitable material and connected with the ground, as by means of a lead 45. The field formed by the tube 35 and roll 12 may be varied in intensity and extent, as desired. For instance, it is possible to make a field of higher unit intensity by reducing the diameter of the tube 35, or a broader field and one of lower unit intensity, by increasing the diameter of the electrode 35. Moreover, the proximity of ground or zero potential affects the field, and if desired, a multiplicity of tubes 35 may be employed.

In order to avoid "end effect", the ends of the tube may be rounded, as illustrated in Fig. 6, wherein the tube 35' is provided with rounded ends or heads 46 which are seated in sockets 47 provided in the insulating post 48.

Furthermore, it has been found at times that by moving the tube 35, as by rotation, will have a pronounced effect upon the character of the field, and that instead of the tube 35, a solid rod may be employed if desired. In some instances, instead of a hollow tube, a wire brush, or a series of wires, such as piano wires, have been found to provide efficient electrodes and to alter the character of the electrostatic field to meet specialized conditions in the application of abrasive material.

Another modified form of electrode is shown in Figure 7, wherein the electrode is provided at one end with a substantially horizontally extending rigid strip 50 of metal, such as copper wire or brass, and at the other end, the lead 36' is directed substantially horizontally, and is exposed for the purpose of providing in effect angularly bent ends of the electrode tube 35'', which may be supported upon the insulating posts 37'. The strip and exposed lead wire being directed toward the sand shower at an angle of about 45° to the tube, serve to decrease "end effect" and to fan out the edge of the sand shower, which, as will be understood, in dropping upon the abrasive material passes through the field. The field may thus be regulated in a manner to modify the dispersing or spacing of the abrasive particles. The variation of the field intensity also necessarily or inherently varies the pull of the particles into the adhesive to a greater or less extent and thus modifies their depth of penetration in the adhesive coat. As the sand enters the electrostatic field, the particles are dispersed, and in such dispersed relation are deposited upon the adhesive surface of the carrier 10. It will be understood, of course, that when the particles enter the field, they receive a charge and the field has the effect of causing a movement of the particles from one pole toward the other. When the poles and carrier with its adhesive surface are arranged as illustrated with the carrier between the poles, the adhesive surface interrupts this flow from the pole 35 toward the pole formed by the roll 12, so that the adhesive surface is contacted by the charged particles in the course of this flow. The effect of the field is to fan out or spread the shower of sand, as illustrated in Figure 1, and ordinarily it has been found that it is preferable to position the regulating gate 22, so that an excess or surplus amount of sand is discharged from the hopper. In order to divert from the normal path of flow such quantity as should not fall upon the carrier, a baffle or diverting plate 51 is positioned with its surface inclined upwardly toward the feed roll, and with one edge 52 entering the shower of sand. This baffle serves to direct a portion of the shower over its surface downwardly into a hopper 53, from which the sand may be removed as desired.

In order to provide suitable means for varying the position of the baffle, so that the amount of sand selected off from the shower may be accurately regulated, the baffle is provided with a pair of upstanding slotted lugs 54, into the slots of which project clamping bolts 55 carried by adjusting arms 56 (Figure 3) which are positioned upon a cross head 57 having end blocks 58 slidably mounted in brackets 59 upon the frame 39. Adjusting screws 60 are threaded in walls 59' of the brackets 59 and have heads 61 swivelled in the boxes 58. As will be understood, manipulation of the screws 60 will guide the blocks and cross head 57 toward and from the sand shower, and thus move the baffle horizontally. The angular portion of the baffle may be varied at the clamping bolts 55, and as will be observed, the arms 56 are provided with a series of openings 56' so that their effective length may be altered.

In Figure 5 there is shown a modified form of electrode comprising an electrified tube 62, which is arranged within a tube 63 of considerably larger diameter and in electrical contact with the electrified tube, by which it is supported. The outer tube considerably enlarges the effective diameter of the electrode, and as will be understood, broadens the field produced. The rod 62 may be connected to a source of high voltage in any suitable manner (not shown).

In operating the apparatus, the position of the baffle 51 will, of course, determine the portion of sand showered from the hopper which will be permitted to fall upon the adhesive surface. As has been explained, instead of bringing the end 22' of the gate close to the feed roll, even with extremely fine sands, in order to determine the exact amount of sand necessary to make the coating desired, the gate is preferably opened sufficiently wide to overcome the packing tendencies of said sands and to obtain a uniform flow, which is in excess of that required to produce a satisfactory coating. The comparatively heavy flow of sand eliminates the necessity for keeping the gate and feed roll perfectly ground, because the irregularities in the sand flow due to surface imperfections on the gate or roll, are very small in proportion to the large amount of sand flowing. As the sand stream leaves the gate, it passes within the influence of the electrostatic field, and immediately causes a dispersion of the particles or a fanning out or widening of the stream or shower. As has been explained, this dispersion can be varied by changing the characteristics of the field by any of the means described. Moreover, varying the voltage controlling the field will control the dispersing action of the same. The adjustment of the baffle 51 will regulate the amount of the shower, which is diverted from the path toward the surface to be coated, and in ordinary practice, it will be found that the control of the amount of grain applied and the character of the coating may be effectively controlled by varying the voltage without making adjustments in the apparatus.

Figure 2:
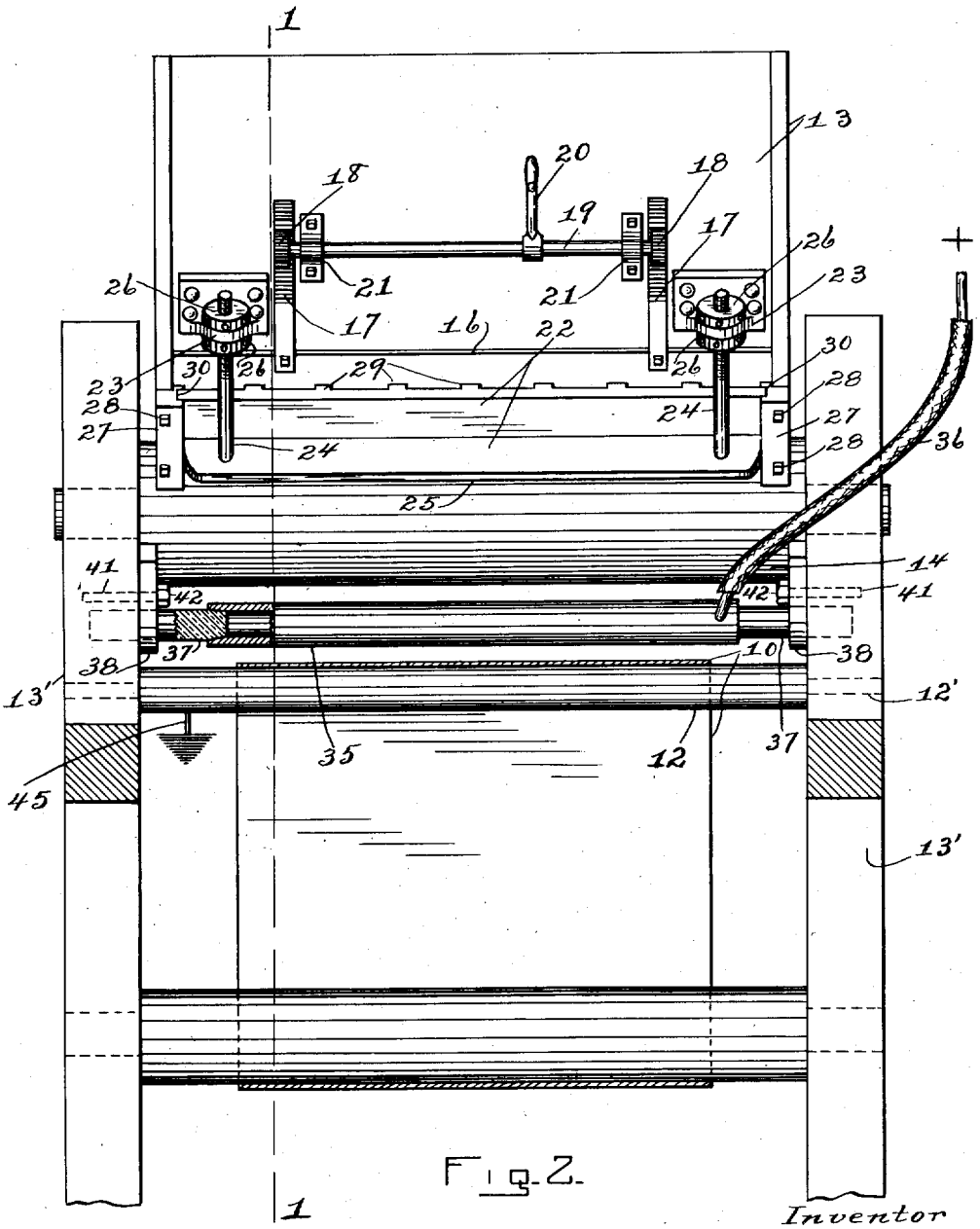
Figure 2 is a vertical sectional view on the line 2—2 of Figure 1.

Since the tube 35 is sufficiently long (Fig. 2) to extend beyond the edges of the paper, the sand will be uniformly applied throughout the entire width of the same, and by properly regulating the speed of travel of the paper, the sand may be continuously applied as the paper travels over the roll 12 to a takeup roll (not shown).

As illustrated in Figure 1, the abrasively coated adhesive surface is conducted from the electrical field over the rolls 12, which engage the undersurface or non-coated surface of the carrier. In other words, the material is completed to provide a finished material having the abrasive particles in their oriented spaced relation determined by the electrical field and the finished product has the characteristics hereinbefore described.

As will be understood, the electrical field is established altogether independently of the carrier, and neither the carrier nor the coating is relied upon to establish the field. As a result, the method is applicable to the manufacture of abrasives with substantially all kinds of adhesive coatings, and the creation of the field is not dependent upon the carrier coating or the movement of the carrier. Moreover, it is possible to localize the field at the point of deposition and to maintain the same of the desired character and strength, in accordance with the regulation of the field, independently of the carrier movement or its coating characteristics.

By the expression "mechanically directing" or "mechanically propelling" the abrasive particles, is meant the subjection of the particles to a force independent of the electrical field and which directs or propels the particles toward the adhesive surface of the carrier.

By the expression "adhesively retaining" as used in the claims with reference to the retention of the particles upon the carrier, is meant the use of means other than electricity for retaining by adhesive action the coating material upon the carrier. By "abrasive" is meant any abrasive or coating material in fragmentary form; by "carrier" is meant any desired material or support on which the fragmentary or divided material may be superimposed or deposited; by "controlled" or "regulated" as applied to the supply or feed of finely divided material to the carrier is meant simply that the material is supplied in such a way as to be responsive to the action of the electrical field for the result desired, whether dispersion or orientation or both.

Obviously, numerous modifications may be made in the structure illustrated and described without departing from the invention, the essence of which is more definitely set forth in the following claims.

I claim:—

1. That improvement in the art of coating a carrier with finely divided abrasive material which consists in gravitationally supplying abrasive particles to the carrier, controlling the positions of the particles upon the carrier by the action of an electrical field substantially at their point of deposition upon the carrier, and adhesively retaining the particles upon the carrier with the positions of the particles arranged by the electrical field.

2. In the art of coating, the improved method which consists in disposing a carrier beneath a source of finely divided abrasive material, dropping the material in controlled amount upon the carrier and subjecting the material as it travels to the carrier to the action of an electrical field so disposed as to orient the individual particles and adhesively retaining the material upon the carrier.

3. In the art of coating, the improvement which consists in supplying by gravity to a permanent carrier regulated amounts of finely divided solid material of a character adapted to be dispersed by electrical action, providing adhesive for retaining the particles on the carrier and dispersing the material in its gravitational path to the carrier by the action of an electrical field, whereby the particles are deposited thereon in dispersed relation.

4. In the art of sand coating a carrier, the improvement which consists in supplying by gravity to the carrier regulated amounts of sand, providing an adhesive for retaining the sand particles on the carrier and dispersing the sand particles by the action of an electrical field as they are applied to the carrier.

5. In the manufacture of abrasives, the improved method which consists in providing a carrier having a surface coated with an adhesive depositing by gravity finely divided abrasive material upon said surface and dispersing the particles by the action of an electrical field as they are being deposited upon the surface.

6. In the manufacture of abrasives, the improved method which consists in providing a carrier having a surface coated with an adhesive, depositing sand by gravity upon said surface and dispersing the particles by the action of an electrical field as they are deposited upon the surface.

7. In the manufacture of abrasives, the improved method which consists in depositing abrasive particles by gravity upon a carrier surface, providing an adhesive material for retaining the particles on the carrier, and dispersing the particles by the action of an electrical field as they are applied to the carrier.

8. In the manufacture of abrasives, the improved method which consists in providing a carrier having a surface coated with an adhesive, depositing by gravity finely divided non-magnetic abrasive material upon said surface from a point thereabove and dispersing the particles upon the surface by the action of an electrical field.

9. An apparatus for the manufacture of coated carriers comprising means for vertically directing a controlled feed of finely divided solid material adapted to be dispersed by an electrical field, means for supporting in the path of said feed an adhesively surfaced carrier to be coated, and a pair of stationary electrodes for producing an electrical field to disperse the individual particles of finely divided material upon said adhesive surface as the material is supplied thereto.

10. An apparatus for the manufacture of coated carriers comprising means for mechanically projecting a controlled feed of finely divided solid material adapted to be dispersed by an electrical field, means for supporting and causing to travel in the path of said material an adhesively surfaced carrier to be coated, and a pair of stationary electrodes for producing an electrical field to disperse the individual particles of finely divided material upon said adhesive surface as the material is supplied thereto.

11. Apparatus for the manufacture of abrasives comprising means for supporting and feeding a carrier provided with a surface coated with an adhesive material for the reception of abrasive particles, means for mechanically projecting toward said adhesive finely divided abrasive material in controlled amount, and stationary electrodes for producing an electrical field adjacent the path of said finely divided material whereby to disperse the particles as they travel toward the adhesive surface, thereby to cause the same to be deposited on said surface in dispersed relation, and means for continuously conducting the abrasively coated carrier away from said field to produce a material having the particles fixed thereon in their positions as determined by the electrical field.

12. Apparatus for the manufacture of abrasively coated carriers comprising means for supporting a carrier having a surface coated with an adhesive material adapted to receive and retain abrasive particles, means above said carrier for supplying by gravity to said adhesive finely divided abrasive material, and means for producing an electrical field adjacent the gravitational path of said material, whereby to disperse the particles as they travel toward the adhesive surface and cause the same to be deposited thereon in dispersed relation.

13. Apparatus for the manufacture of abrasives comprising means for supporting a carrier having a surface coated with an adhesive adapted to receive and retain abrasive particles, means for mechanically directing abrasive particles toward said adhesive surface in controlled amount, and a pair of stationary electrodes for creating adjacent the path of the particles an electrical field adapted to disperse the particles as they travel toward the adhesive surface, whereby to cause the particles to be dispersed on said surface in dispersed relation.

14. In the manufacture of abrasives, the improved method which consists in providing a carrier having a surface coated with an adhesive, gravitationally directing abrasive particles toward said adhesively coated surface, and controlling the position of the particles relative to one another on the carrier by an electrical field.

15. In the manufacture of abrasives, the improved method which consists in providing a carrier having a surface coated with an adhesive, directing by gravity abrasive particles toward said adhesively coated surface, and controlling the position of the particles relative to one another in their path to the carrier and on the carrier by an electrical field.

16. In the manufacture of abrasives, the improved method which consists in providing a carrier having a surface coated with an adhesive, directing abrasive particles toward said carrier by the action of gravity, and controlling the position of the particles relative to one another on the carrier by an electrical field.

17. In the manufacture of abrasives, the improved method which consists in providing a carrier having a surface coated with an adhesive, directing abrasive particles toward said carrier by the action of gravity, and controlling the position of the particles relative to one another in their path to the carrier and on the carrier by an electrical field.

18. In the manufacture of abrasives, the improved method which consists in providing a carrier, directing abrasive particles toward said carrier, controlling the position of the particles relative to one another in their path to the carrier by an electrical field and varying the relative positions of the particles in said path by regulating the electrical field.

19. Apparatus for the manufacture of abrasives, comprising means for supporting a carrier having a surface coated with an adhesive adapted to receive and retain abrasive particles, means above said carrier for supplying abrasive particles and directing the same by gravity toward said surface, and an electrical field disposed in the path of said particles so as to control the arrangement of the same relative to one another at the time they are deposited upon the carrier.

20. Apparatus for the manufacture of abrasives, comprising means for supporting a carrier having a surface coated with an adhesive adapted to receive and retain abrasive particles, means above said carrier for supplying abrasive particles and directing the same by gravity toward said surface, and an electrical field disposed in the path of said particles so as to control the arrangement of the same relative to one another at the time they are deposited upon the carrier, said means being variable whereby to vary the distribution of the particles relative to one another.

21. Apparatus for the manufacture of abrasives, comprising means for supporting a carrier having a surface coated with an adhesive adapted to receive and retain abrasive particles, means for supplying abrasive particles and directing the same toward said surface, an electrical field disposed in the path of said particles so as to control the arrangement of the same relative to one another at the time they are deposited upon the carrier, and means positioned to deflect from said path and away from the carrier particles directed thereto by said first-mentioned means.

22. Apparatus for the manufacture of abrasives, comprising means for supporting a carrier having a surface coated with an adhesive adapted to receive and retain abrasive particles, means for supplying a stream of abrasive particles and directing the same toward said surface, an electrical field disposed in the path of said particles so as to control the arrangement of the same relative to one another at the time they are deposited upon the carrier, and means positioned to deflect from said path and away from the carrier particles directed thereto by said first-mentioned means, said deflecting means being adjustable in position relative to said path whereby to vary the amount of particle stream deflected thereby.

23. Apparatus for the manufacture of abrasives comprising means for conducting an adhesively coated carrier along a predetermined path, a pair of stationary electrodes adjacent said path for creating an electrical field adapted to control the positions of abrasive particles on said carrier, said electrodes serving to create the field independently of the carrier, and means for supplying under the action of said field to said carrier finely divided abrasive particles.

24. Apparatus for the manufacture of abrasives comprising means for conducting an adhesively coated carrier along a predetermined path, a pair of stationary electrodes adjacent said path for creating an electrical field adapted to control the positions of the particles on said carrier, said electrodes serving to create the field independently of the carrier, and means for supplying by gravity to said carrier finely divided abrasive particles.

25. Apparatus for the manufacture of abrasives comprising means for conducting an adhesively coated carrier along a predetermined path, a pair of stationary electrodes adjacent said path for creating an electrical field adapted to control the positions of the particles on said carrier, said electrodes serving to create the field independently of the carrier, and means for supplying to said carrier finely divided abrasive particles, said supplying means serving to deposit the particles on the carrier adjacent the electrical field whereby to effect said control of the positions of the particles by the field substantially at the point of deposition of the particles.

26. Apparatus for making abrasive paper comprising means for conveying a paper backing having an adhesive surface in a substantially horizontal direction, means for supplying abrasive particles and depositing the same upon the backing in a substantially vertical direction, and means for producing an electrical field through which the particles pass on their way to the backing, the lines of force intersecting the path of the particles as it approaches the adhesive surface.

27. In the manufacture of abrasives, the improved method which consists in conducting along a substantially horizontal path an adhesively coated carrier, producing independently of the carrier an electrical field adjacent said path, mechanically directing in a substantially vertical path finely divided abrasive particles to said carrier and depositing the particles on the carrier within the field, and utilizing the electrical field to orient and disperse the particles on the carrier.

28. In the manufacture of abrasives, the improved method which consists in providing a moving carrier having an adhesively coated surface, mechanically projecting abrasive particles toward said surface, controlling the position of the particles relative to one another as they pass to the carrier by an electrical field, and varying the relative positions of the particles in said path and on the carrier by regulating the field.

29. In the manufacture of abrasives, the method which consists in conducting along a path an adhesively coated carrier, creating adjacent said path independently of the carrier and its coating an electrical field, supplying by gravity finely divided abrasive particles to said carrier and utilizing the electrical field to control the positions of the particles on the carrier.

30. In the manufacture of abrasives, the method which consists in conducting along a substantially horizontal path an adhesively coated carrier, creating adjacent said path independently of the carrier and its coating an electrical field, projecting in a substantially vertical path finely divided abrasive particles through the field to said carrier and utilizing the electrical field to control the positions of the particles on the carrier.

31. In the manufacture of abrasives, the improved method of making an "open-coat" abrasive article which consists in establishing an electrical field, supplying finely divided abrasive particles to the electrical field, orienting and dispersing the particles in spaced relation by the electrical field, positioning the dispersed and oriented particles on an adhesively coated carrier, and conducting the carrier away from the field and uniting the particles to the carrier to produce a material having the particles in oriented and spaced positions on said carrier as determined by the electrical field.

32. In the manufacture of abrasives, the improved method of making an "open-coat" abrasive article which consists in conducting an adhesively coated carrier along a predetermined path, establishing an electrical field independently of said carrier, initiating movement of finely divided abrasive particles toward the carrier utilizing the electrical field to disperse in spaced relation the particles on the carrier and conducting the carrier away from the field and uniting the particles to the carrier to produce a material having the particles fixed in spaced relation determined by the electrical field.

33. In the manufacture of abrasives, the improved method which consists in conducting an adhesively coated carrier along a substantially horizontal path, establishing an electrical field independently of the carrier, the lines of force of the field intersecting the surface of the carrier, introducing finely divided abrasive particles into said field, utilizing the electrical field to disperse in spaced relation the particles on the carrier and conducting the carrier away from the field to produce a material having the particles fixed in spaced relation determined by the electrical field.

34. In the manufacture of abrasives, the improved method which consists in conducting an adhesively coated carrier along a substantially horizontal path, establishing an electrical field independently of the carrier, the lines of force of the field intersecting the surface of the carrier, introducing finely divided abrasive particles into said field, utilizing the electrical field to disperse and orient in spaced relation the particles on the carrier and conducting the carrier away from the field to produce a material having the particles fixed in their oriented spaced relation determined by the electrical field.

35. In the manufacture of abrasives, the improved method which consists in conducting an adhesively coated carrier along a predetermined path, establishing an electrical field independently of said carrier, bringing finely divided abrasive particles into said field, utilizing the electrical field to disperse the particles in spaced relation on the carrier and conducting the carrier away from the field to produce a material having the particles fixed in their spaced relation determined by the electrical field.

36. In the manufacture of abrasives, the improved method which consists in conducting along a substantially horizontal path an adhesively coated carrier, establishing an electrical field independently of the carrier, the lines of force of the field intersecting the surface of the carrier, introducing finely divided abrasive particles into said field and utilizing the electrical field to move the particles along the lines of force of the field into the adhesive surface of the carrier and conducting the carrier away from the field to provide a finished material having the particles fixed in their positions as determined by the electrical field.

37. Apparatus for making an abrasive material, comprising electrodes of opposite polarity for establishing an electrical field, means for conveying a backing material having an adhesive surface through said field established by said electrodes independently of the backing material, and means for supplying finely divided abrasive material to said field, the field being arranged to disperse and orient the particles on the adhesive surface of the carrier as it moves therethrough.

38. Apparatus for making abrasive material, comprising electrodes of opposite polarity for establishing an electrical field, means for conveying a backing material having an adhesive surface through said field established by the electrodes independently of the backing material, and means for causing movement of finely divided abrasive particles into said field, said field being arranged to disperse the particles on the adhesive surface of the carrier.

39. In the manufacture of abrasives, the improved method which consists in moving an adhesively coated carrier along a predetermined path, establishing an electrical field between poles of opposite polarity and independently of the carrier, introducing finely divided abrasive particles into said field to receive a charge, and passing the carrier through said established field between said poles with the adhesive surface arranged to be engaged by the charged particles and to interrupt their movement from one pole toward the other.

40. In the manufacture of abrasives, the improved method which consists in moving an adhesively coated carrier along a predetermined path, establishing an electrical field between poles of opposite polarity and independently of the carrier, introducing finely divided abrasive particles into said field to receive a charge, passing the carrier through said established field between said poles with the adhesive surface arranged to be engaged by the charged particles and to interrupt their movement from one pole toward the other and conducting the carrier from the field to produce a finished material having the particles arranged as determined by the field.

41. In the art of coating sheet material, the improved method which consists in moving an adhesively coated sheet-carrier along a predetermined path, establishing by electrode means independent of the carrier an electrical field with its lines of force crossing said path and introducing into said field fragmentary material of a character adapted to be arranged by an electrical field to receive a charge and to be moved by said field against the adhesive surface of the carrier while passing the carrier through said field with the adhesive surface arranged to be engaged by the charged particles and to interrupt their movement by the field.

42. In the art of coating sheet material, the improved method which consists in moving an adhesively coated sheet-carrier along a predetermined path, establishing by electrode means independent of the carrier an electrical field with its lines of force crossing said path and introducing into said field a controlled feed of fragmentary material of a character adapted to be arranged by an electrical field to receive a charge and to be moved by said field against the adhesive surface of the carrier while passing the carrier through said field along said path with the adhesive surface arranged to be engaged by the charged particles and to interrupt their movement by the field.

43. Apparatus for the manufacture of coated sheet material comprising means for conducting an adhesively coated sheet-carrier along a predetermined path, electrode means adjacent said path and independent of a carrier conducted by said first mentioned means for creating an electrical field having its lines of force crossing said path and adapted to arrange fragmentary material of a character adapted to be arranged by an electrical field on the adhesive surface of a carrier conducted along said path by said conducting means, and means for supplying a controlled feed of fragmentary material to said field during the operation of said conducting means.

44. Apparatus for the manufacture of coated sheet material comprising means for conducting an adhesively coated carrier along a predetermined path, stationary electrode means adjacent said path for creating an electrical field having the lines of force crossing said path and adapted to project fragmentary material of a character adapted to be arranged by an electrical field against the adhesive surface of a carrier conducted along said path by said first mentioned means, said second mentioned means serving to create the field independently of a carrier conducted by said first mentioned means, and means for supplying fragmentary material to said field during the operation of said conducting means.

45. Apparatus for the manufacture of coated sheet material comprising means for continuously conducting an adhesively coated carrier along a predetermined path, stationary electrode means adjacent said path for creating an electrical field having the lines of force crossing said path and adapted to project fragmentary material of a character adapted to be arranged by an electrical field against the adhesive surface of a carrier conducted along said path by said first mentioned means, said second mentioned means serving to create the field independently of a carrier conducted by said first mentioned means, and means for continuously supplying a controlled feed of fragmentary material to said field during the operation of said conducting means.

ELMER C. SCHACHT.